May 5, 1953

B. W. ANDRUS 2,637,428

POWER TRANSMISSION UNIT FOR SAWMILL CARRIAGES AND THE LIKE

Filed June 12, 1948

Inventor
Budd W. Andrus
by Eugene D. Farley
Atty.

May 5, 1953

B. W. ANDRUS 2,637,428

POWER TRANSMISSION UNIT FOR SAWMILL
CARRIAGES AND THE LIKE

Filed June 12, 1948

Inventor
Budd W. Andrus
by Eugene D. Farley
Atty.

Inventor
Budd W. Andrus

Fig. 5.

Patented May 5, 1953

2,637,428

UNITED STATES PATENT OFFICE 2,637,428

POWER TRANSMISSION UNIT FOR SAWMILL CARRIAGES AND THE LIKE

Budd W. Andrus, Eugene, Oreg., assignor to Monarch Forge & Machine Works, Portland, Oreg., a corporation of Oregon Application June 12, 1948, Serial No. 32,561

9 Claims. (Cl. 192—145)

This invention relates to a power transmission unit, the same being an improvement over the power transmission unit disclosed and claimed in United States Letters Patent 2,386,923 issued to me on October 16, 1945.

Although the presently described power transmission unit is applicable to a wide variety of machines wherein it is desirable or necessary to stop the motion of the machine after a predetermined interval of operation, it is particularly applicable as the setworks of a sawmill carriage for operating the knees of the carriage. Hence it will be described herein with primary reference to this application, although it is to be understood that no limitation thereby is intended.

It is conventional sawmill practice to reduce a log to boards by placing the log on a sawmill carriage which then is reciprocated with respect to a saw, a portion of the log being sawed off with each pass of the carriage. In the initial stages of the operation, the log is converted to a cant or square timber. This is accomplished by sawing off one face of the log on the first pass of the carriage, rotating the log through 90°, cutting off another face on the second pass, and repeating this sequence until the square cant is produced. The cant then is sawed into boards by reciprocating it on the carriage, the position of the cant being shifted laterally with respect to the carriage and to the saw line after each pass by an amount sufficient to result in the sawing off of a board of the desired thickness. The lateral adjustment necessary for positioning the log properly when converting it to a cant, and for shifting the cant laterally when sawing it into boards, is secured through the agency of the carriage knees, which are driven by a suitable power source and operate to push the log or cant laterally a predetermined and controlled distance. It will be apparent that the precise and positive control of the motion of the carriage knees is of the greatest importance since even slight errors in positioning the logs or cant will result in sawing lumber of untrue dimensions and in the wasting of wood.

It therefore is a principal object of the present invention to provide a power transmission unit wherein positive, automatic means are provided for stopping the motion of the unit after it has operated for a predetermined interval.

Still another object of the present invention is the provision of a power transmission unit in which brake means cooperate with means for interrupting the operation of the unit and act to stop the unit precisely at a predetermined position.

Still a further object of the present invention is the provision of a power transmission unit wherein a timing mechanism is provided for controlling easily and accurately the interval of operation of the unit.

Another object of the present invention is the provision of a power transmission unit which may be started, stopped and reversed positively and easily through a single control.

It is a further object of the present invention to provide a power transmission unit which may be stopped positively after a predetermined interval of operation and which is applicable to the driving of a wide variety of machines where such positive control is necessary or desirable.

It is another object of the present invention to provide a power transmission unit or setworks for sawmill carriages for positioning precisely the knees thereof.

Still another object of the present invention is to provide a setworks for sawmill carriages wherein positive, automatic means are provided for stopping the motion of the carriage knees after they have moved a predetermined interval.

The manner in which the foregoing and other objects of the present invention are accomplished will be apparent from the following specification and claims considered together with the accompanying drawings wherein:

Figures 1, 6, 7:
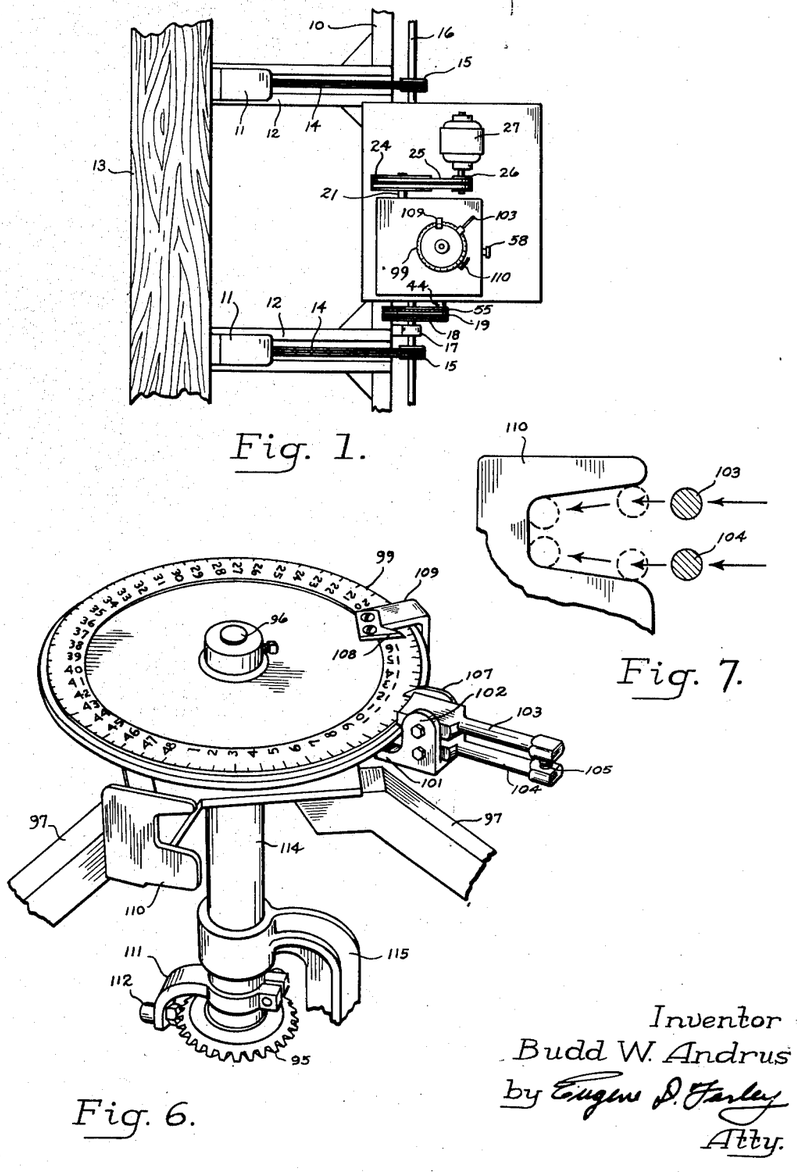
Figure 1 is a fragmentary plan view of a sawmill carriage illustrating the manner of attachment of the power transmission unit of the present invention to a sawmill carriage and its manner of connection to the carriage knees.
Figure 6 (Sheet 1) is a detail view in perspective of the means for setting the timing mechanism.
Figure 7 is a detail view in elevation and partly in section illustrating a safety mechanism for disconnecting the timing mechanism during the reversal of the power transmission unit.
Figure 2:
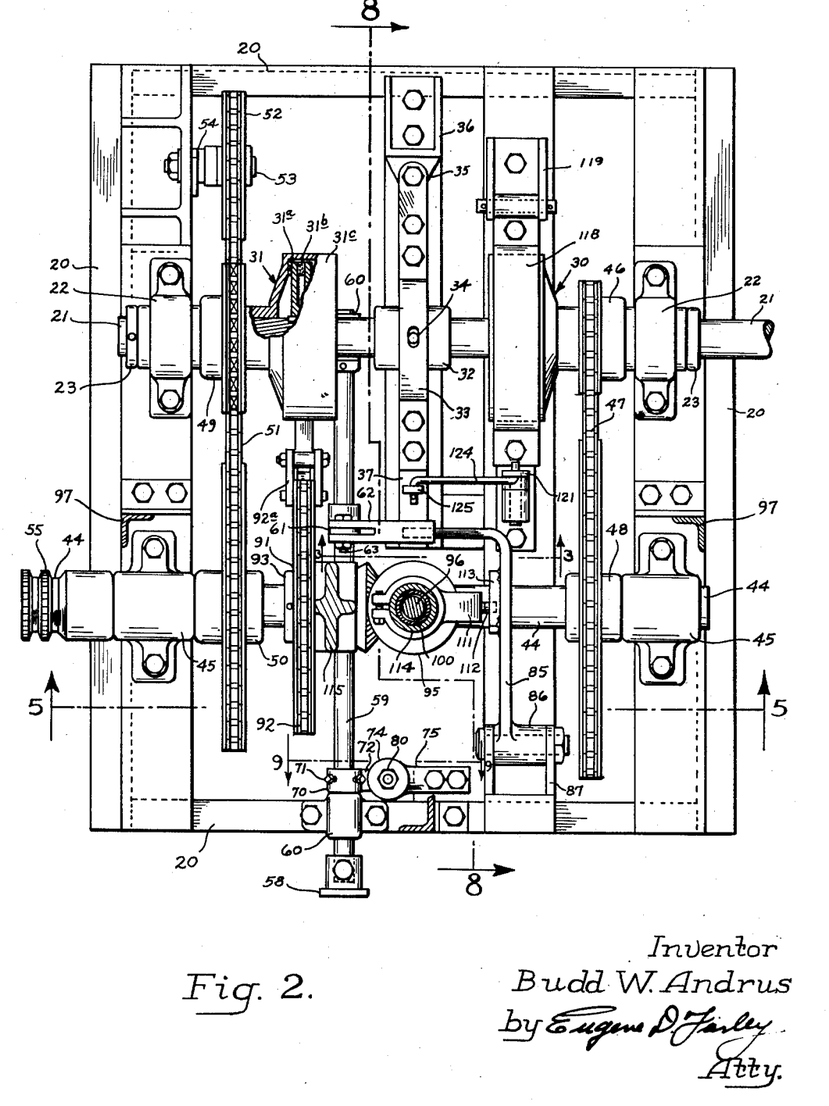
Figure 2 is a plan view showing in detail the construction of the unit.

Referring now more particularly to Figures 1 and 2:

The power transmission unit of the invention is mounted upon a sawmill carriage, the frame of which is indicated at 10. The carriage may be of conventional construction, the knees 11—11 sliding on the head blocks 12—12 and operating upon a cant 13. The knees are driven by the chains 14—14 engaging the sprockets 15—15 which are keyed to the drive shaft (set shaft) 16. The latter is attached to the frame of the carriage through suitable bearings, one of which is indicated at 17. Driving of the shaft 16, and hence of the carriage knees, is obtained through the double sprocket 18 which is keyed to the drive shaft and which is connected to the power transmission unit through the chain 19.

The frame 20 of the power transmission unit is mounted upon the frame 10 of the carriage and carries a clutch shaft 21 mounted in bearings contained in the pillow blocks 22—22 and held in place by means of the set collars 23—23. The clutch shaft is connected to a suitable prime mover by any suitable means as, for example, the pulley wheel 24 keyed to the clutch shaft and interconnected through the belt 25 to a pulley wheel 26 driven by the prime mover. Although any suitable source of power may be used as a prime mover, it is preferred to use an electric motor 27 mounted directly upon the carriage.

Mounted upon the clutch shaft 21 are the direct drive clutch 30 and the reverse drive clutch 31. These are represented generally, since they are of conventional construction. It will be understood that any type of clutch mechanism is adaptable to the purposes of the present invention wherein a first member comprising a clutch plate 31a having friction facings 31b is affixed to the clutch shaft and engageable through cam arms or other means with a second member comprising a housing (spider) 31c which is freely rotatable on the clutch shaft.

The clutches are moved to and from positions of clutch engagement and clutch disengagement by means of the clutch collar 32 which is freely movable on the clutch shaft. When moved against one or the other of the clutches, the clutch collar operates the cam arms or other means for causing the clutch plate to engage frictionally the external housing or spider so that the latter will rotate with the clutch shaft. Then when the clutch collar is moved out of contact with the clutch, the clutch plate becomes disengaged from the clutch housing and power no longer is applied to the latter.

Operation of the clutch collar and hence of the clutches is effected through the clutch shifter 33. This comprises a circular member adapted to encircle the clutch collar and to engage the same through the pins 34—34 which penetrate corresponding openings in the shifter. The clutch shifter pivotally is attached at its rear terminal portion to a bracket 35 which, in turn, is attached to the standard 36 bolted to the frame of the unit. The forward terminal portion of the clutch shifter is formed into an elongated member 37 termed herein "clutch shifter arm" by means of which the shifter may be oscillated to cause the engagement through the clutch collar of one or the other of the clutches.

Figures 8, 9:
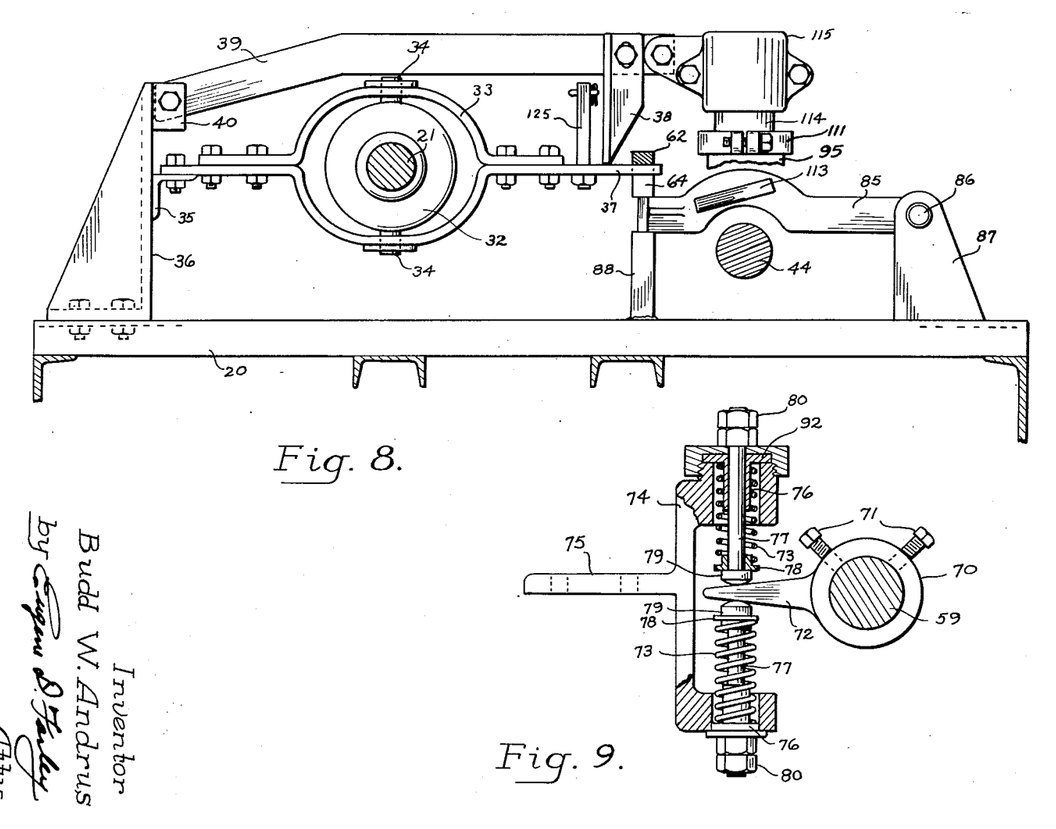
Figure 8 (Sheet 5) is a detail view in elevation partly in section taken along the line 8—8 of Figure 2 and illustrating further the construction of the mechanism for interrupting the motion of the power transmission unit.
Figure 9 is a detail view in elevation partly in section taken along the line 9—9 of Figure 2 and illustrating a mechanism for normally maintaining the unit in neutral position.

A means is provided to prevent displacement of the clutch shifter when heavy loads are being moved by the carriage knees and a corresponding strain is placed upon the direct drive clutch (Figure 8). This comprises the hold down member 38 which is attached to the bar 39, the latter being fastened through the bracket 40 to the standard 36. The hold down member 38 is seated firmly against the clutch shifter arm 37 so that the clutch shifter cannot be displaced upwardly or twisted during use.

The clutch shaft 21 is connected to the drive shaft or set shaft 16 through a counter shaft 44. The latter is attached to the frame of the power transmission unit through suitable bearings 45—45 bolted to the frame. Direct driving of the counter shaft is obtained from the sprocket 46 which is attached rigidly to the housing of the direct drive clutch 30 and which like the housing is freely rotatable on the clutch shaft. The sprocket 46 is interconnected through the chain 47 to the sprocket 48 which is keyed to the countershaft. Thus when the clutch 30 is engaged, the countershaft will be rotated in a direction corresponding to that of the clutch shaft.

The countershaft is rotated in a reverse direction by means of the sprocket 49 which is attached rigidly to the housing of the reverse driving clutch 31 and which together with the latter is freely rotatable about the clutch shaft. The reverse drive sprocket 49 drives the sprocket 50 keyed to the countershaft and connected to the sprocket 49 through the chain 51. To secure the desired direction of rotation of the countershaft, the chain 51 passes around the sprocket 50, under the sprocket 49, and around an idler sprocket 52, which is attached to the frame of the unit through the sprocket pin 53. Adjustment of the idler sprocket as required, for example, to maintain the proper tension in the chain is made possible by the inclusion in the idler sprocket assembly of the set collar 54. Thus when the reverse drive clutch 31 is engaged, the sprocket 50 and the countershaft 44 to which it is keyed will be rotated in a direction which is the reverse of the direction of rotation of the clutch shaft 21.

It is preferred to employ sprocket and chain assemblies as described above for transmitting power from the clutch shaft to the countershaft because of simplicity of construction and ease of making adjustments during use of the unit. It will be apparent to one skilled in the art, however, that alternate connecting means, as suitably arranged gears, may be substituted for either or both of the sprocket and chain assemblies.

Oscillation of the clutch shifter 33, and hence selective engagement and disengagement of the direct drive clutch and the reverse drive clutch, is obtained through the clutch control lever 58. This is mounted on the setworks frame in a position convenient to the operator. It is rigidly connected to the clutch shifter shaft 59 journalled in the bearings 60—60 on the frame of the unit. Rigidly attached to the clutch shifter shaft 59, as by being keyed thereto or fastened thereto with set screws is the lever 61 (see Figures 3 and 4). This, in turn, is connected pivotally to the latch member 62 through the pin (and clevis) 63. The terminal portion of the latch is formed into a J-shaped member the outer leg 64 of which is substantially longer than the inner leg 65, for a reason which will appear hereinafter. Furthermore, the outer leg of the latch is slightly arcuate, the curvature of the arc corresponding roughly to the circumference of the imaginary circle described by the end of the latch as it rotates about the pin 63. This prevents binding of the latch. The latch is adapted to engage and actuate the clutch shifter, the J-shaped portion of the latch being of dimensions such as to receive the arm 37 of the shifter snugly but without binding.

Figure 3:
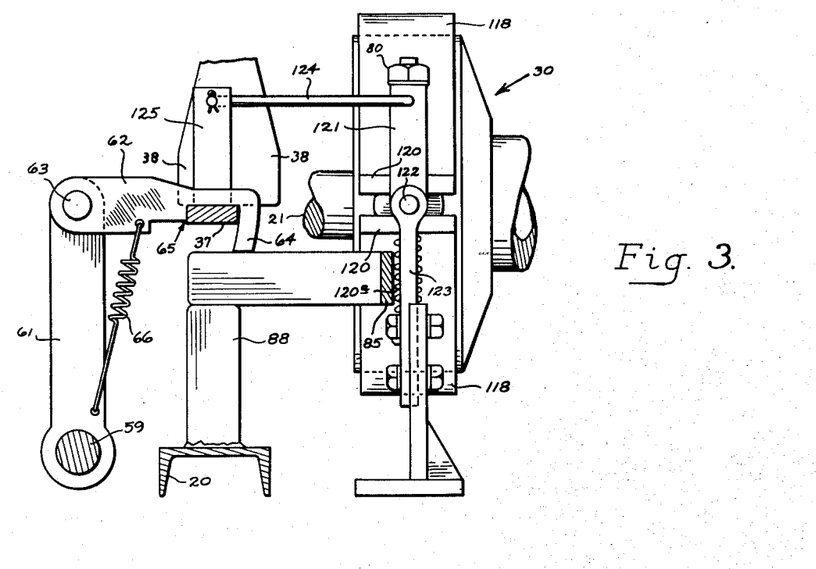
Figure 3 is a detail view in elevation taken on the line 3—3 of Figure 2 and showing the mechanism for interrupting and stopping the motion of the unit.
Figure 4:
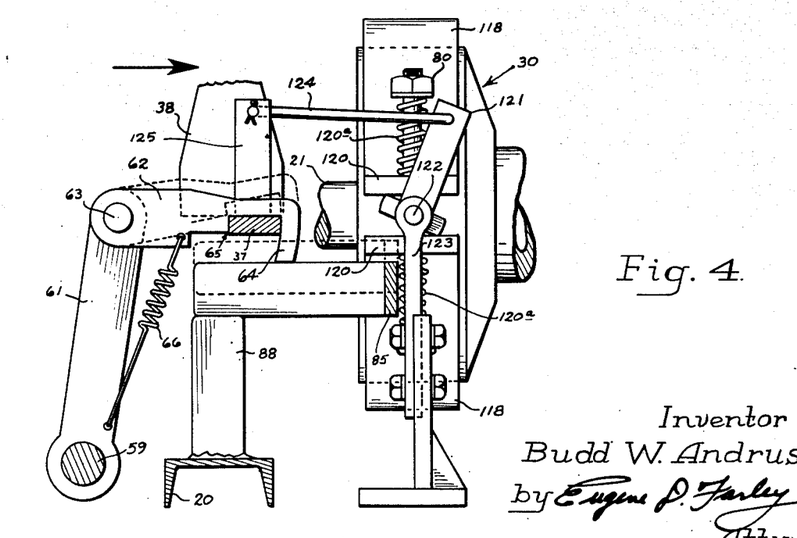
Figure 4 is a view similar to that of Figure 3 and illustrating the action of the interrupting and stopping mechanism.

To insure that the latch will engage the clutch shifter arm securely, there may be included in the assembly the spring 66 interposed between the lever 61 and the latch 62. It will be apparent that the tension of the spring will hold the latch so that it engages the shifter arm securely at all times except when force is applied to the latch to move it out of engagement therewith.

Means also may be provided for holding the clutch shifter shaft, and hence the clutch shifter, in a position of clutch disengagement, so that the unit may be operated only by a positive force applied to the control lever. Although such means may assume a variety of forms, in the embodiment illustrated (Figure 9) they comprise the collar 70 rigidly affixed to the clutch shifter shaft through the set screws 71 and having extending outwardly therefrom the tapered projection 72. The latter is adapted to be engaged and held by resilient means such as a spring loaded mechanism attached to the frame of the unit and comprising a pair of springs, one on either side of the projection. The springs suitably may be leaf springs but preferably comprise compression springs 73—73 mounted in the housing 74 which is bolted or otherwise attached to the bracket 75 affixed to the frame of the unit. The housing 74 is recessed to provide access to a pair of guides 76—76 each of which encircles a bolt 77 serving as a contact member for contacting the projection 72 on the clutch shifter shaft. Adjacent the heads of the bolts is a second pair of guides or seating members 78—78 which cooperate with the guides 76 in holding the springs in position. The head 79 of each bolt is rounded so that it engages the tapered projection 72 without binding. The bolts are held in position by means of the lock nuts 80 which are taken up sufficiently so that the springs are under slight tension. The clutch shifter shaft 59 thus is maintained in neutral position until a positive force is applied to the control lever, whereupon it may be moved against the tension of one of the springs of the holder until the desired clutch is engaged. Upon release of pressure on the control lever, however, the clutch shifter will be returned automatically to a neutral position in which neither clutch is engaged.

In operating the power transmission unit of the present invention, the motor 27 is started and kept running continuously. This rotates the clutch shaft 21 without driving the countershaft 44 or the drive shaft 16 until the direct drive clutch or the reverse drive clutch is engaged. However, when the clutch control lever 58 is moved in a clockwise direction, the clutch shifter shaft 59 is actuated, thereby rotating the clutch shifter lever 61 and moving both the latch and the clutch shifter in the direction indicated by the arrow of Figure 4. This moves the clutch collar 32 against the elements of the direct driving clutch 30 appropriate to engage the same and drive the sprocket 46 attached to the housing thereof. This drives the sprocket 48 and the countershaft 44 and hence, through the sprocket 55, the driveshaft or set shaft 16.

Forward operation of the unit continues until the direct drive clutch 30 is disengaged. This may be accomplished automatically, as will further be described hereinafter, or manually by adjusting the clutch control lever 58 to a neutral position, it being maintained in this position by the spring loaded clutch holder indicated at 74.

When it is desired to reverse the motion of the drive shaft (set shaft), the clutch control lever may be moved in a counterclockwise direction thereby correspondingly rotating the clutch shifter shaft 59 and moving the clutch shifter lever 61 and the latch 62 in a direction opposite to that indicated by the arrow of Figure 4. This moves the clutch shifter in a direction such that the clutch collar 32 contacts the appropriate elements of the reverse drive clutch 31 and engages the same. The sprocket 49 thereby is rotated in a direction such as to impart a reverse motion to the sprocket 50, and the countershaft 44 and the drive shaft 16 to which it is connected. The reverse motion of the unit may be continued for the desired period, whereupon it may be arrested by returning the clutch control lever to its position of neutrality, it again being held in such position by the spring loaded mechanism indicated at 74.

Although the power transmission unit of the present invention may be operated manually in the manner described above, it is a primary feature of the invention that means are provided for disengaging automatically the direct drive clutch and for stopping the operation of the unit after a predetermined interval of operation of the drive shaft. When the clutch shifter lever is advanced and the direct drive clutch engaged as indicated in Figure 4, the force of the operation is borne by the short leg 65 of the J-shaped portion of the latch. Therefore, if the latch be lifted an amount sufficient to displace the short leg above the plane of the upper surface of the clutch shifter arm 37, the clutch shifter automatically will slip back into a neutral position, thereby disengaging the clutch.

Means for moving the latch in this manner are provided in the clutch or latch release arm 85 (Fig. 8). This is an elongated member lying above the countershaft 44 and pivotally connected at its rear end through the bearing 86 to the bracket 87 which, in turn, is attached to the frame of the unit. The forward end of the clutch release arm is bent at right angles to the shank thereof and is located directly below the latch, resting on the support 88 which, like the bracket 87, is attached to the frame of the unit. It will be apparent that when the clutch release arm is moved in the direction of the latch, it will contact first the long leg 64 of the J-shaped portion thereof (Figs. 3 and 4). Further movement of the arm will move the latch sufficiently so that the short leg 65 will clear the clutch shifter arm. If the clutch shifter is in advanced position with the direct drive clutch engaged, it then will be retained no longer by the latch but will be free to slip back into neutral position, thereby disengaging the clutch.

The clutch release arm 85 is operated by means of a timing mechanism which now will be described with particular reference to Figure 5. The timing mechanism is driven directly from the drive shaft or set shaft 16 to which is keyed the sprocket 90. This is of a predetermined size with respect to the plate sprocket 91 to which it is connected through the chain 92, which is maintained taut by the chain tightener 92a. The plate sprocket is freely rotatable about the countershaft and is attached through the cap plate and cap screws 93 to the boss of the miter gear 94. The latter, like the plate sprocket attached thereto, is not connected to the countershaft but is freely rotatable thereupon. The miter gear 94 drives a cooperating miter gear 95 which is attached rigidly to the timer shaft 96.

The timer shaft, and the timing assembly are supported by the supporting brackets 97—97 which are bolted to the frame of the unit at one end and attached at the other end to the supporting plate 98. The latter is perforated to provide access to the timer shaft 96 and encasing members. Attached to the timer shaft at the end opposite the miter gear 95 is the indicating dial 99 having on the exposed surface thereof a scale graduated into convenient units, as in inches (see Figure 6). The dial is attached rigidly to the timer shaft and rotates with it.

Enclosing the timer shaft and extending with it upwardly through the perforation in the plate 98 is the sleeve 100 which terminates at its upper extremity just below the indicating dial 99 and at its lower extremity at the miter gear 95. The sleeve is spaced apart from the timer shaft and is free to move independently. Attached to its upper end, however, are means for tying it to the timer shaft so that it may be rotated thereby. Such means in the form illustrated comprise the setter arm 101 fastened rigidly to the sleeve through a collar or otherwise and having at its free end a bracket 102 to which pivotally are attached a pair of levers comprising an upper setter handle 103 and a lower setter handle 104. The inner ends of the two setter handles are positioned one on either side of the indicating dial and form a jaw member adapted normally to clasp the dial and thus frictionally interconnect the timer shaft 96 and the sleeve 100.

Means also are provided for maintaining pressure of the jaw formed by the setter handles on the indicating dial. Such means may comprise a compression spring 105 interposed between the two handles.

Also attached to the bracket portion 102 of the setter arm 101 is the index finger 107. This cooperates with a stationary index finger 108 on the supporting bracket 109 attached to the plate 98 and is used to set the timing mechanism so that the direct drive clutch will be released automatically in a manner to be described hereinafter.

Since as stated above the setter handles normally are held in contact with the indicating dial by means of the spring 105, thereby tying the sleeve to the timer shaft, means are provided for disengaging the handles from the dial upon reversal of the unit, thus breaking the connection and preventing damage to the mechanism by overrunning. As illustrated, the means employed comprise the bifurcated stop member 110 which is bolted or otherwise affixed to the plate 98. The opening in the bifurcated member is wedge shaped and adapted to receive the two setter handles as they revolve about the timing shaft. Upon entering the opening, however, the setter handles come in contact with the opposite inclined faces of the opening and are forced together as shown in Fig. 7. This compresses the spring 105, opens the jaw formed by the inner end portions of the setter handles, and releases the indicating dial which then is free to rotate with the timer shaft without carrying with it the setter arm and sleeve 100.

Figure 5:
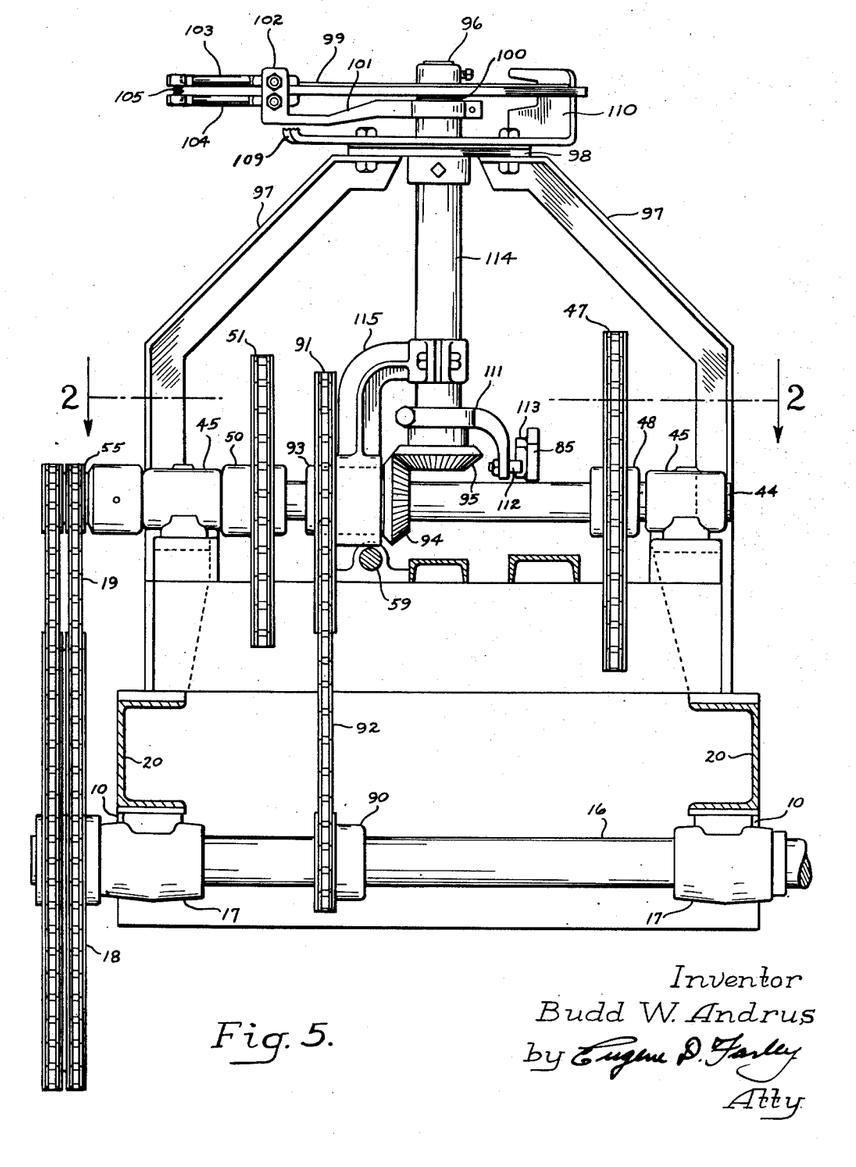
Figure 5 is a view in elevation taken along the lines 5—5 of Figure 2 and illustrating the construction of the timing mechanism whereby the motion of the power transmission unit may be interrupted and stopped after a predetermined interval.

Attached to the end of the sleeve opposite the setter arm is the cam 111 which rotates with the sleeve (Fig. 5). The outer portion of the cam is bent at substantially right angles to the shank portion thereof and carries a projecting member 112. The latter is adapted to contact and actuate the cam follower 113. Since the cam follower is directly attached to the clutch release arm 85, movement of the follower moves the arm, thereby lifting the latch 62 and releasing the direct drive clutch.

The timing assembly is completed by the housing or casing 114, which encases and protects the inner sleeve and shaft, and the supporting bracket 115 which supports the miter gear 94 through a collar at its lower end. The bracket 115 supports also one end of hold down bar 39.

In operating the timing mechanism, the setter handles are squeezed together thereby releasing the setter arm which is rotated to a desired setting as indicated on the dial. This obviously will rotate by a corresponding amount the cam 111 which, like the setter arm, is attached to the sleeve 100. The setter handles then are released thus causing the jaws to engage the indicator dial and tying together the timer shaft 96 and the sleeve 100. The unit then is put in operation in the manner indicated hereinabove by adjusting the clutch control lever in a clockwise direction to engage the direct drive clutch. The control lever is held in this position continuously, thereby driving continuously the drive shaft (set shaft) 16. Rotation of the latter drives the timing shaft 96 through the chain and sprockets 90, 91 and 92 and the miter gears 94 and 95. The timing shaft in turn rotates the sleeve 100 and attached cam 111. The operation continues until the contact member 112 of the cam engages the cam follower 113 on the clutch release arm. The arm then opens the latch permitting movement of the clutch shifter 33 to disengage the direct drive clutch. The operation of the drive shaft is halted in this manner independently of the clutch control lever.

Means also are provided for stopping the drive shaft and preventing its overriding after the disengaging of the clutch. Such means preferably are coordinated with the clutch disengaging mechanism and broadly comprise a braking mechanism applied substantially contemporaneously with the operation of the disengaging means. Although the brake may be variously designed and applied to the countershaft or the drive shaft, it preferably for reasons of simplicity of construction and efficiency of operation is applied to the housing of the direct drive clutch. Since this operates the sprocket 46 which drives the countershaft, stopping its motion effectively arrests the motion of the countershaft.

In the form illustrated (Figures 3 and 4), the brake comprises a pair of brake shoes 118, 118 which pivotally are attached to the frame through suitably disposed brackets, one of which is indicated at 119 (Fig. 2). The brake shoes are provided with a suitable friction lining and their free ends are provided with flanges 120, 120. The brake shoes normally are in a closed position engaging the direct drive clutch and preventing the rotation of its housing. Suitably mounted spring loaded mechanisms 120a, 120a bearing against the outer faces of the flanges 120, 120 preferably are employed for this purpose.

Opening of the brake drums and hence release of the direct drive clutch is secured by operation of a cam 121 in the form of an off-set T, the crossbar of the T being interposed between the flanges on the brake shoes. Rotatable mounting of the cam is obtained by means of a pin 122 journalled in a supporting bracket 123. Movement of the cam about the pin in either direction thus will pry apart the flanges on the brake shoes and release the brake.

Release of the brake contemporaneously with the engagement of the direct drive clutch is made possible by connecting the shank of the brake cam through the connecting link 124 to the clutch shifter 33 or, preferably, to a projection 125 extending outwardly therefrom so that proper alignment of the connecting link between the clutch shifter and the brake cam may be secured.

As will be apparent particularly from a consideration of Figures 3 and 4, oscillation of the clutch shifter lever 61 will induce a corresponding oscillation in the clutch shifter 33 and will rock the brake cam about the pin 122, thus alternately releasing and applying the brake to the direct drive clutch. When the clutch control lever is advanced in a clockwise direction, the clutch shifter will be moved to engage the direct drive clutch while the brake cam will be operated simultaneously to release the brake. Then when the clutch is disengaged by adjustment of the clutch shifter, either manually through the control lever or automatically by operation of the clutch release arm 85, the brake cam will be moved so that the brake is applied and the motion of the disengaged direct drive clutch and hence of the drive shaft will be arrested immediately.

A complete cycle of operation of the power transmission unit of the present invention as applied in the setworks of a sawmill carriage now will be described. At the start of the operation, the motor 27 is started and maintained running continuously, thus maintaining continuous rotation of the clutch shaft. The clutch control lever then is moved in a counterclockwise direction. This moves the clutch shifter so that the reverse drive clutch 31 is engaged, thereby reversing the drive shaft and withdrawing the carriage knees from the saw line. During this operation, the handles of the setter arm enter the bifurcated stop member 110, thus releasing automatically the grip of the handles on the indicating dial, disconnecting the timer shaft 96 from the sleeve 100 and preventing damage which otherwise might occur to the cam 111 from contact with other members of the assembly.

After disengaging the reverse drive clutch by movement of the clutch control lever, a cant is loaded upon the carriage and the clutch control lever is moved in a clockwise direction. This releases the brake on the direct drive clutch, engages the clutch and advances the cant toward the saw line.

When the cant has reached the saw line, the operator notes the position of the stationary index finger 108 with respect to the numerals of the indicating dial. The reading may be, for example, 17 inches where a cant having a cross section of 17 inches has been placed on the carriage (Figure 6). Then, if it is desired to cut a 4½-inch timber from the cant, he squeezes together the setter handles and moves the setter arm until the index finger thereon is opposite the 12½-inch mark on the indicating dial. He then releases the setter handles, thereby tying together the sleeve 100 and the timer shaft 96. This adjustment also has moved the cam 111 to a position corresponding to that of the indicating finger on the setter arm.

The operator then adjusts the clutch control lever in a clockwise direction which releases the brake on the direct drive clutch and contemporaneously engages the clutch. He holds the clutch control lever in this position while the drive operates continuously to advance the carriage knees the desired 4½ inches. While such advancement is in progress, the gap between the indicating finger 107 on the setter arm and that of the stationary indicating finger 108 gradually closes, as does that between the cam 111 and the cam follower 113. When the lateral displacement of the carriage knees is exactly 4½ inches, the clutch release arm 85 will trip the latch 62, thereby disengaging the direct drive clutch and simultaneously applying the brake thereto. The motion of the knees thus is stopped instantly and exactly at the desired point without any overrunning. This sequence of operations may be repeated until the cant has been reduced entirely to timbers or boards.

Having now described my invention in preferred embodiments what I claim as new and desire to protect by Letters Patent is:

1. Setworks for sawmill carriages having knees slidably mounted thereon, said setworks comprising: a rotatably mounted clutch shaft connectable to a source of power; first and second clutch units mounted on the clutch shaft, each clutch unit including a first member rigid to the clutch shaft, a second member rotatable thereabout, and means for releasably coupling the two members; a pair of spring-pressed brake shoes positioned for releasably engaging the second member of the first clutch; a rotatably mounted countershaft; direct drive means interconnecting the second member of the first clutch unit and the countershaft; reverse drive means interconnecting the second member of the second clutch unit and the countershaft; a rotatably mounted drive shaft positioned for driving connection with the carriage knees; means interconnecting the countershaft and the drive shaft for driving the drive shaft from the countershaft; a clutch shifter collar slidably mounted on the clutch shaft intermediate the clutch units; a pivotally mounted clutch shifter arm engaging the collar for reciprocating the collar between a first position wherein it releasably couples together the members of the second clutch unit for reverse driving the drive shaft, and an intermediate inoperative position; cam means connected to the clutch shifter arm and wedged between the brake shoes for separating them against the tension of the springs associated therewith when the collar is in its first position, thereby releasing the brake, and for permitting closure of the brake shoes by the springs when the collar is in its inoperative position, thereby applying the brake shoes; a rotatably mounted rock-shaft; a latch releasably engaging the clutch shifter arm and connected to the rock-shaft; a control lever rigidly affixed to the rock-shaft; a projection on the rock-shaft; a pair of opposed spring-pressed plungers bearing against the rock-shaft for maintaining the same normally in a neutral position; a timing shaft rotatably mounted adjacent the drive shaft; means interconnecting the timing shaft and the drive shaft for rotating the timing shaft; a dial rigid to one end of the timing shaft; a rotatable sleeve encircling the timing shaft; an indexing arm rigid to the end of the sleeve adjacent the dial; jaw means on the indexing arm for releasably gripping the dial, enabling setting the jaw means at a predetermined station thereon preliminary to direct driving of the drive shaft; bifurcated stop means positioned adjacent the dial for engaging and separating the jaw means upon reverse driving of the drive shaft; a cam arm rigid to the other end of the sleeve and rotatable with the dial when the jaws grip the same; a pivotally mounted latch release arm; and a cam follower on the latch release arm, the cam follower being positioned for contacting the cam arm and actuating the latch release arm, thereby releasing the latch, uncoupling the first clutch unit and applying the brake shoes thereto for arresting the motion of the drive shaft immediately after a rotation of the dial determined by the setting of the indexing arm.

2. Setworks for sawmill carriages having knees slidably mounted thereon, said setworks comprising: a rotatably mounted clutch shaft connectable to a source of power; first and second clutch units mounted on the clutch shaft, each clutch unit including a first member rigid to the clutch shaft, a second member rotatable thereabout, and means for releasably coupling the two members; a pair of spring-pressed brake shoes positioned for releasably engaging the second member of the first clutch; a rotatably mounted countershaft; direct drive means interconnecting the second member of the first clutch unit and the countershaft; reverse drive means interconnecting the second member of the second clutch unit and the countershaft; a rotatably mounted drive shaft positioned for driving connection with the carriage knees; means interconnecting the countershaft and the drive shaft for driving the drive shaft from the countershaft; a clutch shifter collar slidably mounted on the clutch shaft intermediate the clutch units; a pivotally mounted clutch shift arm engaging the collar for reciprocating the collar between a first position wherein it releasably couples together the members of the first clutch unit for direct driving the drive shaft, a second position wherein it releasably couples together the members of the second clutch unit for reverse driving the drive shaft, and an intermediate inoperative position; cam means connected to the clutch shifter arm and wedged between the brake shoes for separating them against the tension of the springs associated therewith when the collar is in its first position, thereby releasing the brake, and for permitting closure of the brake shoes by the springs when the collar is in its inoperative position, thereby applying the brake shoes; a rotatably mounted rock-shaft; a latch releasably engaging the clutch shifter arm and connected to the rock-shaft; a timing shaft rotatably mounted adjacent the drive shaft; means interconnecting the timing shaft and the drive shaft for rotating the timing shaft; a dial rigid to one end of the timing shaft; a rotatable sleeve encircling the timing shaft; an index arm rigid to the end of the sleeve adjacent the dial; jaw means on the indexing arm for releasably gripping the dial, enabling setting the jaw means at a predetermined station thereon preliminary to direct driving of the drive shaft; a cam arm rigid to the other end of the sleeve and rotatable with the dial when the jaws grip the same; a pivotally mounted latch release arm; and a cam follower on the latch release arm; the cam follower being positioned for contacting the cam arm and actuating the latch release arm, thereby releasing the latch, uncoupling the first clutch unit and applying the brake shoes thereto for arresting the motion of the drive shaft immediately after a rotation of the dial determined by the setting of the indexing arm.

3. Setworks for sawmill carriages having knees slidably mounted thereon, said setworks comprising: a rotatably mounted clutch shaft connectable to a source of power; first and second clutch units mounted on the clutch shaft, each clutch unit including a first member rigid to the clutch shaft, a second member rotatable thereabout, and means for releasably coupling the two members; brake means positioned for braking the second member of the first clutch unit; a rotatably mounted countershaft; direct drive means interconnecting the second member of the first clutch unit and the countershaft; reverse drive means interconnecting the second member of the second clutch unit and the countershaft; a rotatably mounted drive shaft positioned for driving connection with the carriage knees; means interconnecting the countershaft and the drive shaft for driving the drive shaft from the countershaft; a clutch shifter collar slidably mounted on the clutch shaft intermediate the clutch units; a pivotally mounted clutch shifter arm engaging the collar for reciprocating the collar between a first position wherein it releasably couples together the members of the first clutch unit for direct driving the drive shaft, a second position wherein it releasably couples together the members of the second clutch unit for reverse driving the drive shaft, and an intermediate inoperative position; brake-operating means connected to the clutch shifter arm and operative to release the brake when the collar is in its first position, and to apply the brake when the collar is in its inoperative position; a rotatably mounted rockshaft; a latch releasably engaging the clutch shifter arm and connected to the rock-shaft; control means affixed to the rock-shaft for adjusting the position of the collar; a timing shaft rotatably mounted adjacent the drive shaft; means interconnecting the timing shaft and the drive shaft for rotating the timing shaft; a dial rigid to one end of the timing shaft; a rotatable sleeve encircling the timing shaft; an index arm rigid to the end of the sleeve adjacent the dial; gripping means on the indexing arm for releasably gripping the dial at a predetermined station preliminary to direct driving of the drive shaft; stop means positioned adjacent the dial for engaging and separating the gripping means upon reverse driving of the drive shaft; a cam arm rigid to the other end of the sleeve and rotatable with the dial when the gripping means grip the same; a pivotally mounted latch release arm; and a cam follower on the latch release arm; the cam follower being positioned for contacting the cam arm and actuating the latch release arm, thereby releasing the latch, uncoupling the first clutch unit and applying the brake thereto for arresting the motion of the drive shaft immediately upon releasing the latch.

4. Setworks for sawmill carriages having knees slidably mounted thereon, said setworks comprising: a rotatably mounted clutch shaft connectable to a source of power; a clutch unit mounted on the clutch shaft and including a first member rigid to the clutch shaft, a second member rotatable thereabout, and means for releasably coupling the two members; brake means positioned for releasably engaging the second member of the clutch; a rotatably mounted countershaft; direct drive means interconnecting the second member of the clutch unit and the countershaft; a rotatably mounted drive shaft positioned for driving connection with the carriage knees; means interconnecting the countershaft and the drive shaft for driving the drive shaft from the countershaft; reverse drive means connected to the drive shaft; a clutch shifter collar slidably mounted on the clutch shaft; a pivotally mounted clutch shifter arm engaging the collar for reciprocating the collar between a neutral position and an operative position wherein it releasably couples together the members of the clutch unit for direct driving the drive shaft; a brake-operating means connected to the clutch shifter arm and operative to release the brake when the collar is in its operative position, and to apply the brake when the collar is in its neutral position; a rotatably mounted rock-shaft; a latch releasably engaging the clutch shifter arm and connected to the rock-shaft; control means affixed to the rock-shaft for adjusting the position of the collar through the clutch shifter arm; a rotatable timing shaft, means interconnecting the timing shaft and the drive shaft for rotating the timing shaft; a dial rigid to one end of the timing shaft; a rotatable sleeve encircling the timing shaft; an index arm rigid to the end of the sleeve adjacent the dial; jaw means on the indexing arm for releasably gripping the dial, enabling setting the jaw means at a predetermined station thereon preliminary to direct driving of the drive shaft; bifurcated stop means positioned adjacent the dial for engaging and separating the jaw means upon reverse driving of the drive shaft; a cam arm rigid to the other end of the sleeve and rotatable with the dial when the jaws grip the same; a pivotally mounted latch release arm; and a cam follower on the latch release arm; the cam follower being positioned for contacting the cam arm and actuating the latch release arm, thereby releasing the latch and uncoupling the clutch unit while substantially contemporaneously applying the brake thereto.

5. Setworks for sawmill carriages having knees slidably mounted thereon, said setworks comprising: a rotatably mounted clutch shaft connectable to a source of power; a rotatably mounted countershaft; clutch means mounted on the clutch shaft, means interconnecting the clutch means and the countershaft for driving the countershaft from the clutch means; a rotatably mounted drive shaft positioned for driving connection with the carriage knees; means interconnecting the countershaft and the drive shaft for driving the drive shaft from the countershaft; reverse drive means connected to the drive shaft; brake means operable to arrest the motion of the clutch means; clutch shifting means positioned for engaging and disengaging the clutch means; brake-operating means connected to the clutch shifting means and operative to release the brake when the clutch means is engaged and to apply the brake when the clutch means is disengaged; a rock-shaft; a latch releasably engaging the clutch shifting means and connected to the rock-shaft; means affixed to the rock shaft for rocking the same; a rotatable timing shaft; means interconnecting the timing shaft and the drive shaft for rotating the timing shaft; a dial rigid to one end of the timing shaft; a rotatable sleeve encircling the timing shaft; an index arm rigid to the end of the sleeve adjacent the dial; grip means on the indexing arm for releasably gripping the dial, enabling setting the grip means at a predetermined station thereon preliminary to direct driving of the drive shaft; stop means positioned adjacent the dial for disengaging the grip means upon reverse driving of the drive shaft; a cam arm rigid to the other end of the sleeve and rotatable with the dial when the grip means grips the same; a pivotally mounted latch release arm positioned for releasably engaging the latch; and a cam follower on the latch release arm; the cam follower being positioned for contacting the cam arm and actuating the latch release arm, thereby releasing the latch and disengaging the clutch means while applying the brake means thereto.

6. Setworks for sawmill carriages having knees slidably mounted thereon, said setworks comprising: a rotatably mounted clutch shaft connectable to a source of power; a rotatably mounted countershaft; clutch means mounted on the clutch shaft, means connecting the clutch means and the countershaft for driving the countershaft from the clutch means; a rotatably mounted drive shaft positioned for driving connection with the carriage knees; means interconnecting the countershaft and the drive shaft for driving the drive shaft from the countershaft; clutch shifting means positioned for coupling and uncoupling the clutch means; a latch releasably engaging the clutch shifting means; a rotatable timing shaft; means interconnecting the timing shaft and the drive shaft; a dial rigid to one end of the timing shaft; a rotatable sleeve encircling the timing shaft; an index arm rigid to the end of the sleeve adjacent the dial; grip means on the index arm for releasably gripping the dial at a predetermined setting; a cam arm rigid to the other end of the sleeve and rotatable with the dial when the grip means grips the same; a pivotally mounted latch release arm positioned for releasably contacting the latch; and a cam follower on the latch release arm; the cam follower being positioned for contacting the cam arm and actuating the latch release arm, thereby releasing the latch and uncoupling the clutch means after a rotation of the dial determined by the setting of the index arm.

7. Setworks for sawmill carriages having knees slidably mounted thereon, said setworks comprising: a rotatably mounted clutch shaft connectable to a source of power; clutch means mounted on the clutch shaft, means interconnecting the clutch means and the countershaft for driving the countershaft from the clutch means; a rotatably mounted drive shaft positioned for driving connection with the carriage knees; means interconnecting the countershaft and the drive shaft for driving the drive shaft from the countershaft; clutch shifting means positioned for coupling and uncoupling the clutch means; latch means releasably engaging the clutch shifting means; a rotatable timing shaft; means interconnecting the timing shaft and the drive shaft; a dial rigid to one end of the timing shaft; a rotatable sleeve encircling the timing shaft; an index arm rigid to the end of the sleeve adjacent the dial; grid means on the index arm for releasably gripping the dial at a predetermined setting; cam means rigid to the other end of the sleeve and rotatable with the dial when the grip means grips the same; a pivotally mounted latch release arm positioned for releasably contacting the latch; and a cam follower means on the latch release arm; the cam follower means being positioned for contacting the cam means and actuating the latch release arm, thereby releasing the latch and uncoupling the clutch means after a rotation of the dial determined by the setting of the index arm.

8. Setworks for sawmill carriages having knees slidably mounted thereon, said setworks comprising: a rotatably mounted clutch shaft connectable to a source of power, a drive shaft connectable to the carriage knees, clutch means mounted on the clutch shaft, means interconnecting the clutch means and the drive shaft for driving the drive shaft from the clutch means; clutch shifting means for engaging and disengaging the clutch means; a rock-shaft; a latch releasably interconnecting the clutch shifting means and the rock-shaft; control means connected to the rock-shaft for operating the clutch shifting means through the latch; a rotatable timing shaft; means interconnecting the timing shaft and the drive shaft for driving the timing shaft from the drive shaft; a dial rigid to one end of the timing shaft; a rotatable sleeve encircling the timing shaft; an index arm rigid to the end of the sleeve adjacent the dial; grip means on the index arm for releasably gripping the dial at a predetermined setting; bifurcated stop means positioned adjacent the dial for engaging and releasing the grip means upon reverse driving of the drive shaft; a cam arm rigid to the other end of the sleeve and rotatable with the dial when the grip means grips the same; a pivotally mounted latch release arm positioned for releasably engaging the latch; and a cam follower on the latch release arm; the cam follower being positioned for contact by the cam arm and for actuation of the latch release arm, thereby releasing the latch and disengaging the clutch means after a rotation of the dial determined by the setting of the index arm.

9. Setworks for sawmill carriages having knees slidably mounted thereon, said setworks comprising: a drive shaft connectable to the carriage knees, clutch means connectable to a source of power; connecting means interconnecting the clutch means and the drive shaft; clutch shifting means for engaging and disengaging the clutch means; a rock-shaft; a latch releasably interconnecting the clutch shifting means and the rock-shaft; control means connected to the rock-shaft for operating the clutch shifting means through the latch; a rotatable timing shaft; means interconnecting the timing shaft and the drive shaft for driving the timing shaft from the drive shaft; a dial rigid to one end of the timing shaft; a rotatable sleeve encircling the timing shaft; an index arm rigid to the end of the sleeve adjacent the dial; grip means on the index arm for releasably gripping the dial at a predetermined setting; a pivotally mounted latch release arm adjacent the latch, and contact means on the other end of the sleeve and rotatable with the dial when the grip means grips the same, the contact means being positioned for contacting and actuating the latch release arm, and thereby disengaging the clutch means after a rotation of the dial determined by the setting of the index arm.

BUDD W. ANDRUS.

References Cited in the file of this patent

UNITED STATES PATENTS

| Number | Name | Date |
|---|---|---|
| 511,220 | Babcock et al. | Dec. 26, 1893 |
| 582,851 | Dimond et al. | May 18, 1897 |
| 731,037 | Tucker | June 16, 1903 |
| 1,004,837 | Wright | Oct. 3, 1911 |
| 1,073,310 | Willette | Sept. 16, 1913 |
| 1,440,650 | Walton | Jan. 2, 1923 |
| 1,492,317 | Willette | Apr. 29, 1924 |
| 1,505,005 | Dorman | Aug. 12, 1924 |
| 1,786,776 | Pelton | Dec. 30, 1930 |
| 1,912,112 | Wunsch | May 30, 1933 |
| 2,052,752 | Criley | Sept. 1, 1936 |
| 2,180,469 | Jaeger et al. | Nov. 21, 1939 |
| 2,267,415 | Myers | Dec. 23, 1941 |
| 2,386,923 | Andrus | Oct. 16, 1945 |